No. 734,318. PATENTED JULY 21, 1903.
J. GENISIO.
SAFETY CATCH FOR ELEVATORS.
APPLICATION FILED FEB. 21, 1903.
NO MODEL. 2 SHEETS—SHEET 2.
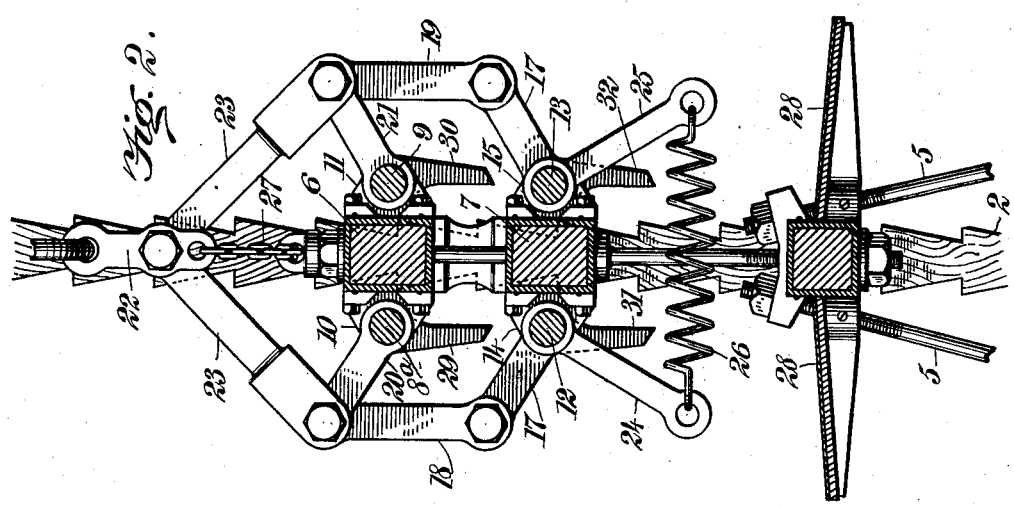
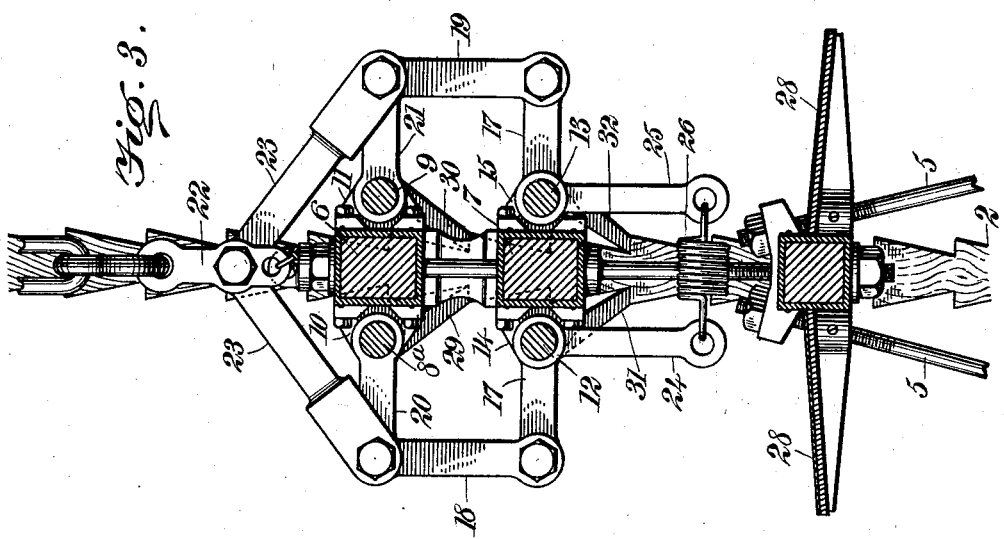
WITNESSES:
INVENTOR
James Genisio
BY
ATTORNEYS.

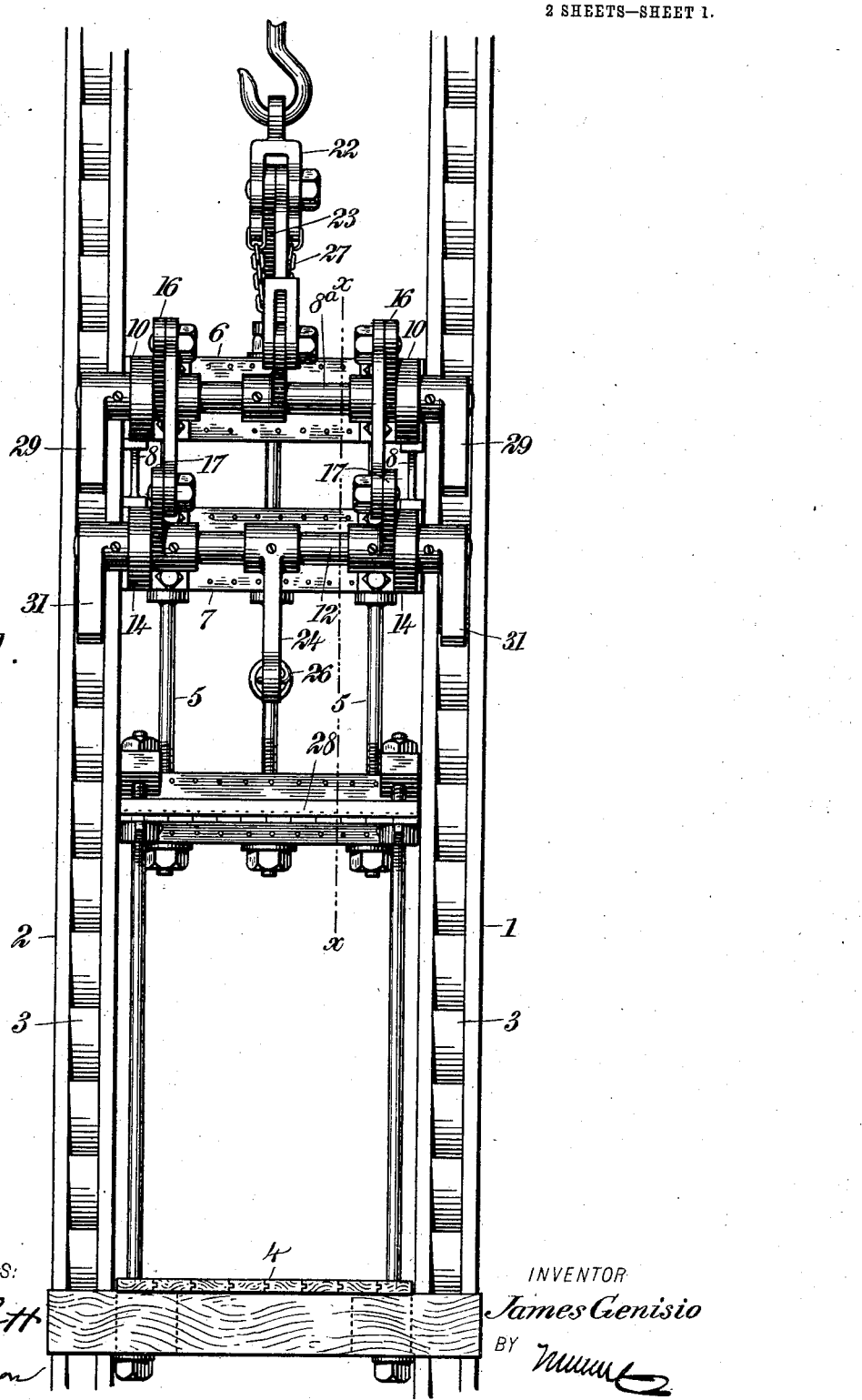

No. 734,318.

Patented July 21, 1903.

UNITED STATES PATENT OFFICE.

JAMES GENISIO, OF DUQUOIN, ILLINOIS.

SAFETY-CATCH FOR ELEVATORS.

SPECIFICATION forming part of Letters Patent No. 734,318, dated July 21, 1903.

Application filed February 21, 1903. Serial No. 144,462. (No model.)

*To all whom it may concern:*

Be it known that I, JAMES GENISIO, a citizen of the United States, and a resident of Duquoin, in the county of Perry and State of Illinois, have invented a new and Improved Safety-Catch for Elevators, of which the following is a full, clear, and exact description.

This invention relates to improvements in safety-catches for elevators, particularly elevator-cages used in mining-shafts; and the object is to provide a safety-catch of simple construction that will quickly and automatically operate to prevent the falling of the cage should the cable break.

I will describe a safety-catch for elevator-cages embodying my invention and then point out the novel features in the appended claim.

Reference is to be had to the accompanying drawings, forming a part of this specification, in which similar characters of reference indicate corresponding parts in all the figures.

Figure 1 is an elevation showing a safety-catch for elevator-cages embodying my invention; and Figs. 2 and 3 are sections on the line $x\ x$ of Fig. 1, showing the parts in different positions.

Referring to the drawings, 1 2 designate the guide-bars for the elevator-cage, which guide-bars are provided with teeth 3 on their opposite sides. Movable between the guides is a frame from which the elevator-cage 4 is suspended by means of rods 5. This frame consists of an upper bar 6 and a lower bar 7, connected by rods 8. Arranged on opposite sides of the upper bar 6 are rock-shafts $8^a$ 9, the rock-shaft $8^a$ having bearings in brackets 10, while the rock-shaft 9 has bearings in brackets 11. Similar shafts 12 13 are arranged at opposite sides of the bar 7, the shaft 12 having bearings in brackets 14 and the shaft 13 having bearings in brackets 15.

Extended from and rocking with the shafts $8^a$ 9 are arms 16, and arms 17 are extended from the opposite shafts 12 13 to rock therewith, the arms of the two shafts at one side being connected by links 18, and the arms at the opposite side are connected by links 19. At the central portion of the shafts $8^a$ and 9 and rocking therewith are outwardly-extended arms 20 and 21, which are pivotally connected to a clevis 22 by means of links 23, this clevis being provided with an eye to which the hoisting-cable is to be attached. Attached centrally to the shafts 12 13 and rocking therewith are downwardly-disposed arms 24 25, which are connected together by means of a spring 26. From the clevis 22 a chain 27 extends to a connection with the upper bar 6 of the frame. To prevent material from falling upon a person or persons in the cage, I provide the upper portion of said cage with guard-plates 28, which extend laterally, as clearly shown in the drawings.

The shafts $8^a$ and 9 are respectively provided with dogs 29 30, which are rigid therewith, for engaging with the ratchet-teeth of the guides, and the shafts 12 and 13 are provided with dogs 31 32 for engaging with said teeth.

In the operation when the cage is drawn upward the parts will be in the position indicated in Fig. 2—that is, with the dogs out of engagement with the ratchet-teeth—and the strain will be on the chain 27. Should the cable break, the spring 26 through the medium of the links 18 19 will rock the several shafts to throw the dogs into engagement with the ratchet-teeth, thus instantly stopping the cage or preventing it from falling.

Having thus described my invention, I claim as new and desire to secure by Letters Patent—

In safety devices for elevators, the combination with vertical opposite guides within the elevator-shaft, each provided on parallel faces thereof with ratchet-teeth, of a cage provided with a frame comprising parallel bars disposed one above the other and rigidly connected together, pairs of rock-shafts supported in bearings on opposite sides of each of said bars, said shafts having rigid dogs at their ends for engaging corresponding sets of said ratchet-teeth, rigid arms projecting from said shafts near the ends, and links movably connecting corresponding ones of said arms on each side of the bars, centrally-disposed rigid arms also projecting from each of the upper rock-shafts, a clevis to which the hoisting-cable for the cage is attached, movable connections between said last-named arms and said clevis, downwardly and centrally disposed arms rigid with the lower rock-shafts, and a spring connecting these arms, the whole operating substantially as herein shown and described.

In testimony whereof I have signed my name to this specification in the presence of two subscribing witnesses.

JAMES GENISIO.

Witnesses:
HARRY B. WARD,
ANGELO GENISIO.